Oct. 9, 1956  T. CARRIGAN  2,765,701
METHOD OF AND APPARATUS FOR MEASURING ALIGNMENT
CHARACTERISTICS OF FRONT AND REAR WHEELS
Original Filed April 3, 1946  12 Sheets-Sheet 1

INVENTOR.
TRACY CARRIGAN
BY
Hans G. Hoffmeister
ATTORNEY

INVENTOR.
TRACY CARRIGAN

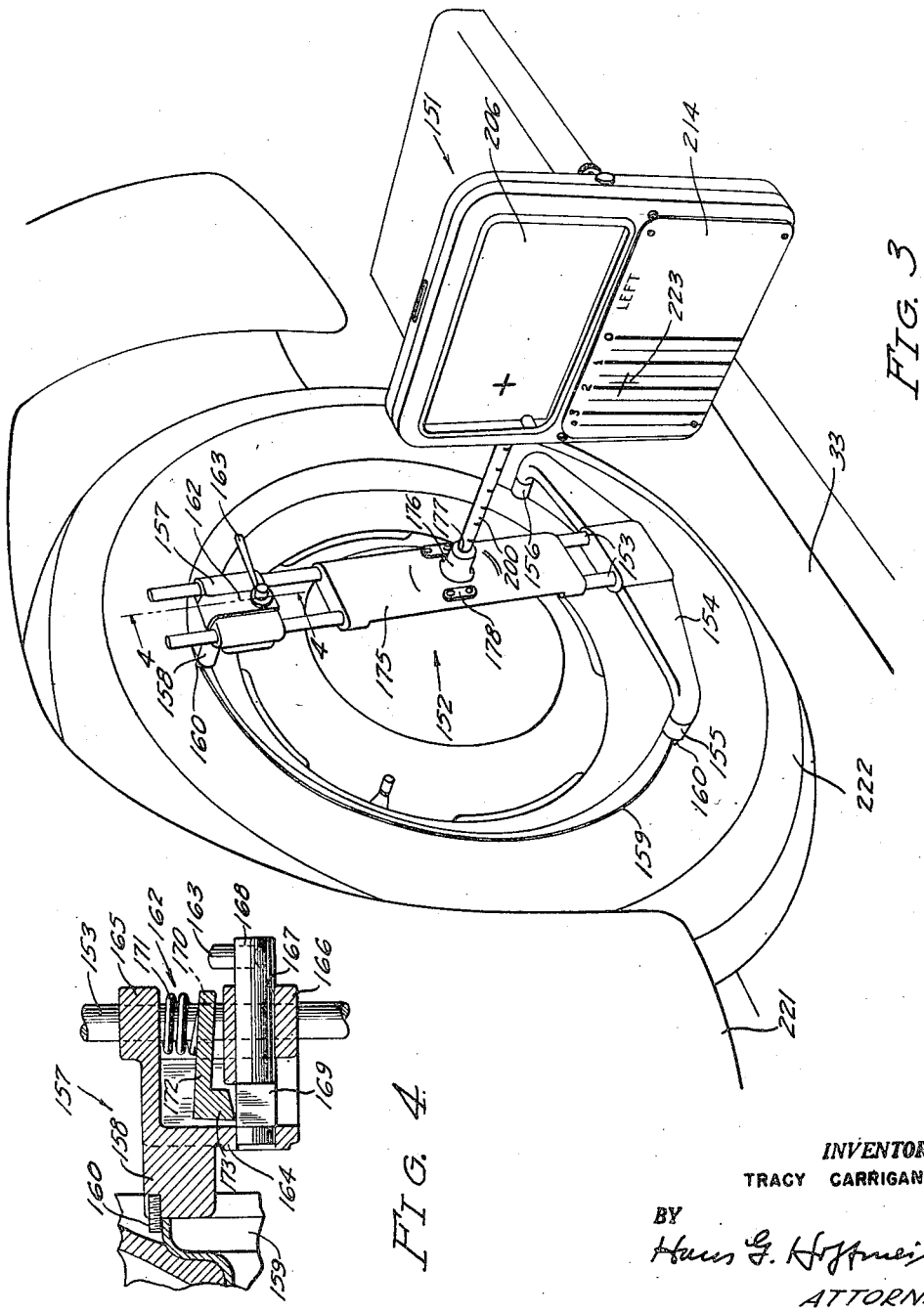

Oct. 9, 1956

T. CARRIGAN 2,765,701

METHOD OF AND APPARATUS FOR MEASURING ALIGNMENT
CHARACTERISTICS OF FRONT AND REAR WHEELS

Original Filed April 3, 1946

INVENTOR.
TRACY CARRIGAN

BY
Hans G. Hoffmeister.
ATTORNEY

Oct. 9, 1956 T. CARRIGAN 2,765,701
METHOD OF AND APPARATUS FOR MEASURING ALIGNMENT
CHARACTERISTICS OF FRONT AND REAR WHEELS
Original Filed April 3, 1946 12 Sheets-Sheet 5

INVENTOR.
TRACY CARRIGAN
BY
Hans G. Hoffmeister
ATTORNEY

INVENTOR.
TRACY CARRIGAN
BY
Hans G. Hoffmeister
ATTORNEY

INVENTOR.
TRACY CARRIGAN
BY
Hans G. Hoffmeister
ATTORNEY

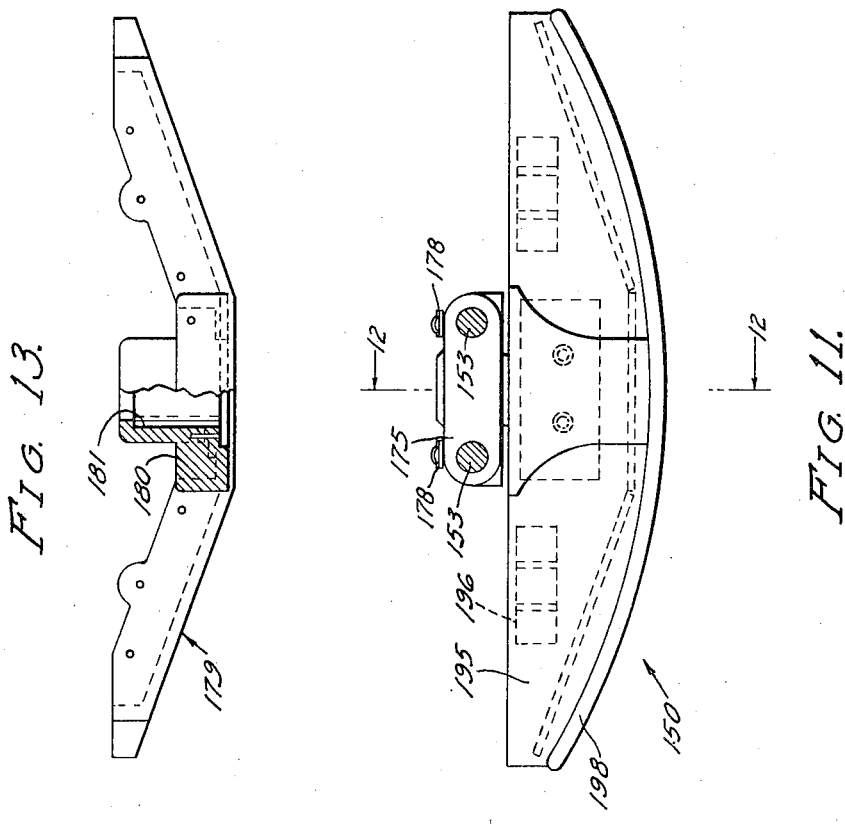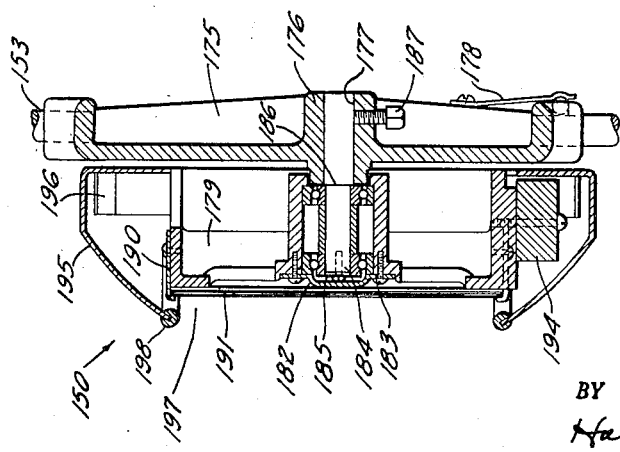

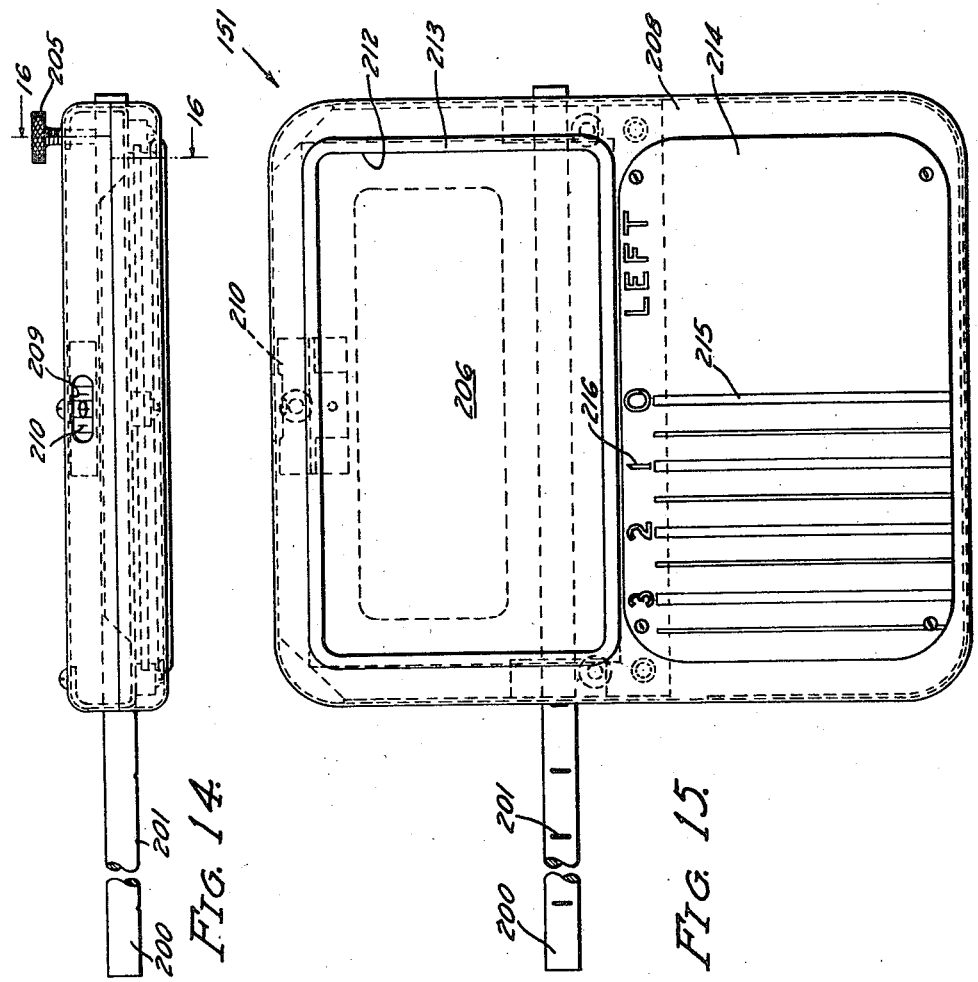
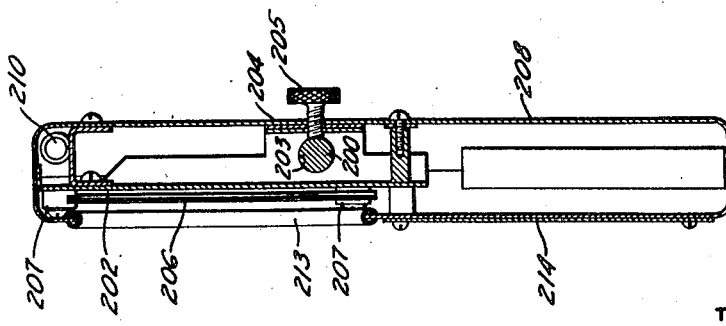

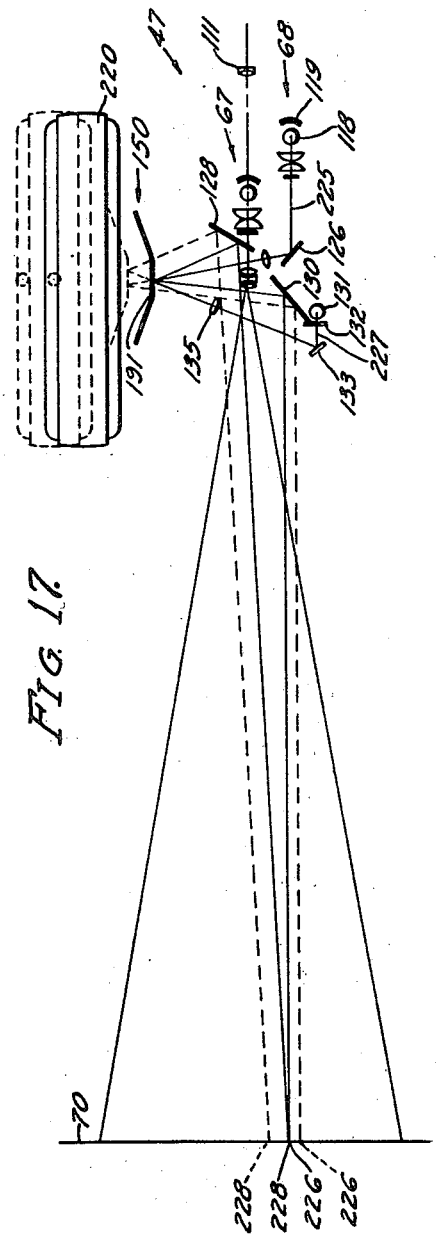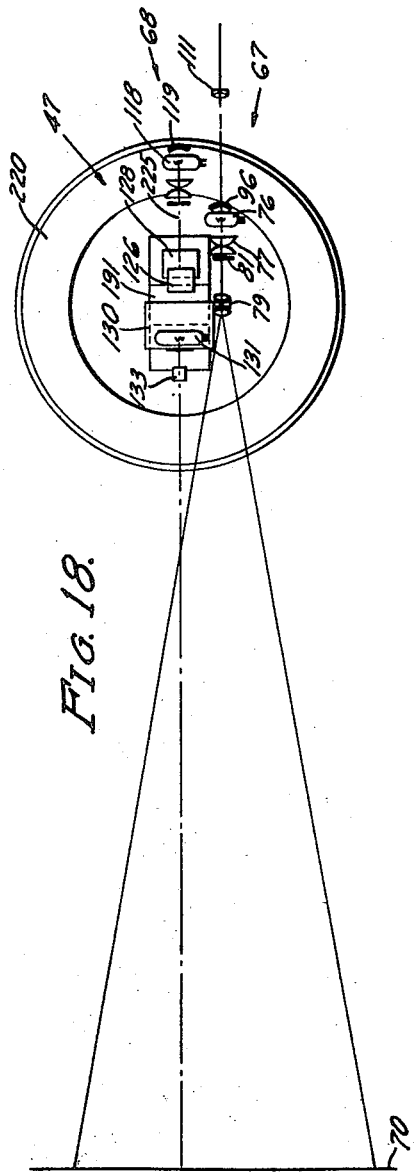

Oct. 9, 1956   T. CARRIGAN   2,765,701
METHOD OF AND APPARATUS FOR MEASURING ALIGNMENT
CHARACTERISTICS OF FRONT AND REAR WHEELS
Original Filed April 3, 1946   12 Sheets-Sheet 11

INVENTOR.
TRACY CARRIGAN
BY
Hans G. Hoffmeister
ATTORNEY

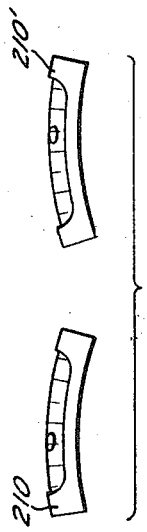
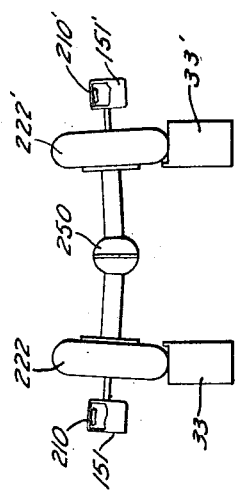
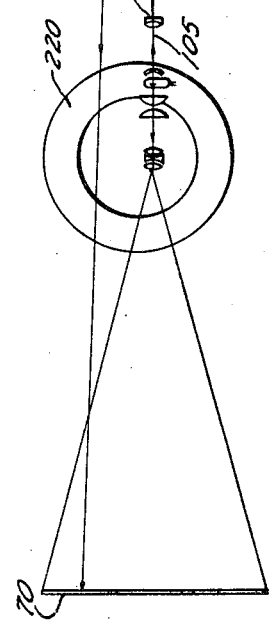
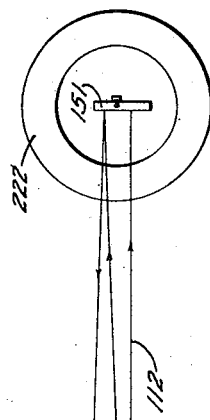
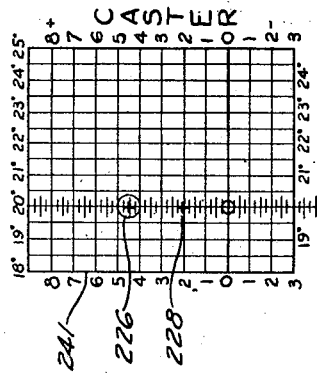
INVENTOR.
TRACY CARRIGAN

United States Patent Office 2,765,701
Patented Oct. 9, 1956

2,765,701

METHOD OF AND APPARATUS FOR MEASURING ALIGNMENT CHARACTERISTICS OF FRONT AND REAR WHEELS

Tracy Carrigan, Lansing, Mich., assignor to Food Machinery and Chemical Corporation, San Jose, Calif., a corporation of Delaware Original application April 3, 1946, Serial No. 659,317, now Patent No. 2,601,262, dated June 24, 1952. Divided and this application April 17, 1952, Serial No. 282,866

9 Claims. (Cl. 88—14)

This invention relates to the art of checking the alignment of vehicle wheels.

The present invention is particularly adapted for use in conjunction with the method and apparatus for optically aligning vehicle wheels disclosed in U. S. Patent 2,470,090, granted May 17, 1949, to Herbert G. Holmes, Clyde A. Shoemaker and myself.

It is an object of this invention to provide a novel method of and apparatus for checking alignment characteristics of dirigible vehicle wheels.

It is another object of my invention to provide a novel method of and apparatus for checking the alignment of non-dirigible drive wheels of a vehicle.

It is another object of the invention to provide a method of and apparatus for accomplishing any or all of the foregoing objects optically and indicating the results so that they may be seen and readily understood by unskilled persons, and particularly by the average automobile owner.

The manner of accomplishing the foregoing objects, as well as further objects and advantages, will be made manifest in the following description taken in connection with the accompanying drawings in which:

Fig. 3 is a close-up perspective view of the rear left wheel of said automobile while the alignment thereof is being checked by said apparatus.

Fig. 4 is a vertical sectional view through the clutch-clamp of the device preferably employed to mount mirrors on the wheels being tested.

Fig. 11 is a plan view of said front wheel mirror.

Fig. 12 is a cross sectional view taken on the line 12—12 of Fig. 11.

Fig. 13 is a plan view of said front wheel mirror frame partly broken away to illustrate the inner construction.

Fig. 14 is a plan view of the left rear wheel mirror of the invention.

Fig. 15 is a front elevational view of Fig. 14.

Fig. 16 is a cross sectional view taken on the line 16—16 of Fig. 14.

Fig. 17 is a plan diagram of the operation of the left hand optical unit of the apparatus.

Fig. 18 is a side elevational view of Fig. 17.

Fig. 25 is a rear elevational diagram of an automobile being checked and showing the differential housing sprung vertically so that the axes of rotation of the wheels on opposite ends thereof are out of alignment with each other in a vertical plane.

Fig. 26 is an enlarged diagram of the left and right bubble levels provided on the drive wheel mirrors of the apparatus of the invention as these are disposed by the condition illustrated in Fig. 25.

Fig. 27 is a side elevational diagram showing the paths of light beams employed in this invention for checking the alignment of the rear drive wheels of a vehicle.

Fig. 28 is a diagrammatic view illustrating the camber chart employed in the invention.

Fig. 29 is a diagrammatic view illustrating the caster chart employed in the invention as set during the initial cocking of the left front wheel of an automobile being checked for caster.

Fig. 30 is a view similar to Fig. 29 illustrating the reading of caster on said caster chart after the reverse cocking of said left front wheel.

Figure 1:
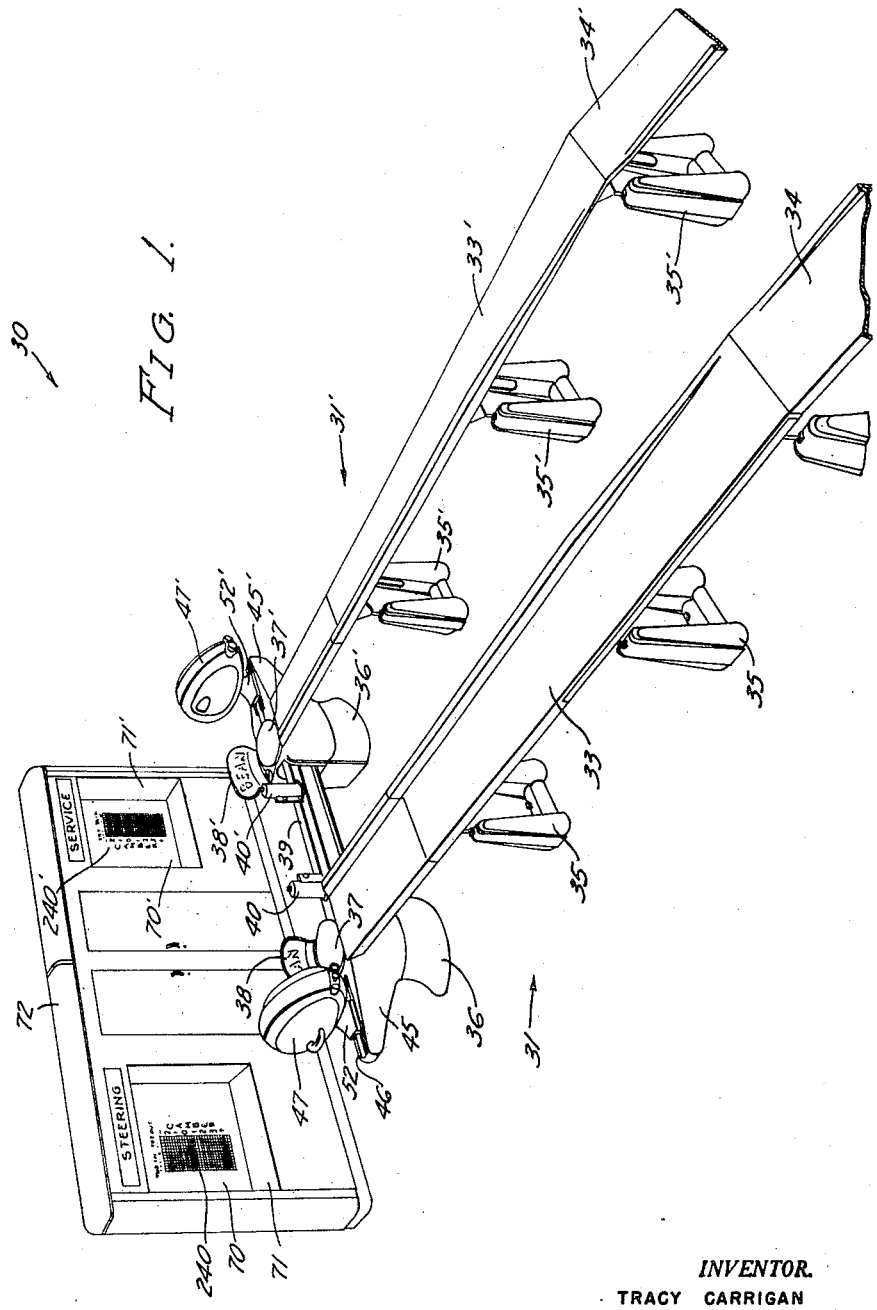
Fig. 1 is a perspective view of a preferred embodiment of the apparatus of the invention.

Referring specifically to the drawings, the preferred embodiment of the apparatus of the invention is indicated therein by the numeral 30 and includes two apparatus sections, a left hand section 31 and a right hand section 31' which are reverse duplicates of each other so that a detailed disclosure and description of one will suffice for both. Only the left hand section is thus disclosed and described. Whatever reference is made to the right hand apparatus section 31' will, therefore be made by using the reference numerals of corresponding parts in the left hand section 31, with prime attached.

Figure 2:
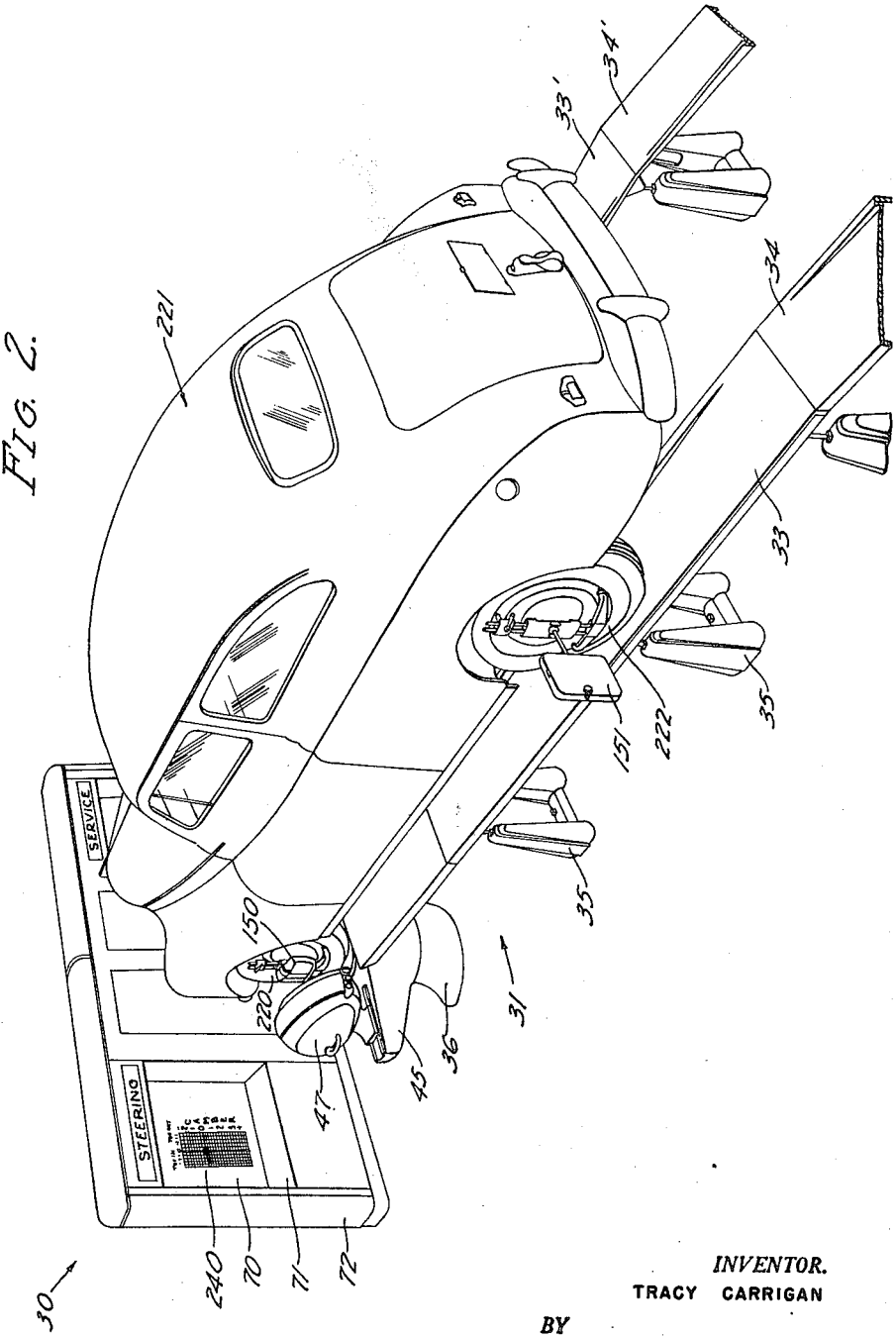
Fig. 2 is a perspective view of an automobile supported on the apparatus shown in Fig. 1 and in the process of having the alignment of the four wheels thereof checked by said apparatus.

The two apparatus sections 31 and 31' are mounted on a testing floor in parallelism as shown in perspective in Fig. 1 so that a vehicle to be tested can be driven onto and off of the apparatus, as shown in Fig. 2, under its own power.

The left hand apparatus section 31 includes a wheel track 33 and an approach ramp 34, which are supported on legs 35 and a turntable base 36, at the front end of the track, which carries a turntable 37 and a front wheel bumper 38. Extending between and supported on the turntable bases 36 and 36' is a double jack beam 39 which supports jacks 40 and 40'.

Formed integral with and extending laterally from the turntable base 36 is a horn 45 which embodies an optical unit slideway 46 on which an optical unit 47 is slidably mounted.

The slideway 46 is embodied in an upper wall of the horn 45. This wall has a central slot 48 (Fig. 6) on opposite sides of which are provided a flat rail 49 and a double bevel rail 50. Adjacent the slot 48 and formed downwardly from the upper wall of horn 45 are a pair of internal rails 51. The slot 48 and the rails 49, 50 and 51 are all horizontal, parallel to one another, and perpendicular to the vehicle wheel track 33.

Figure 6:
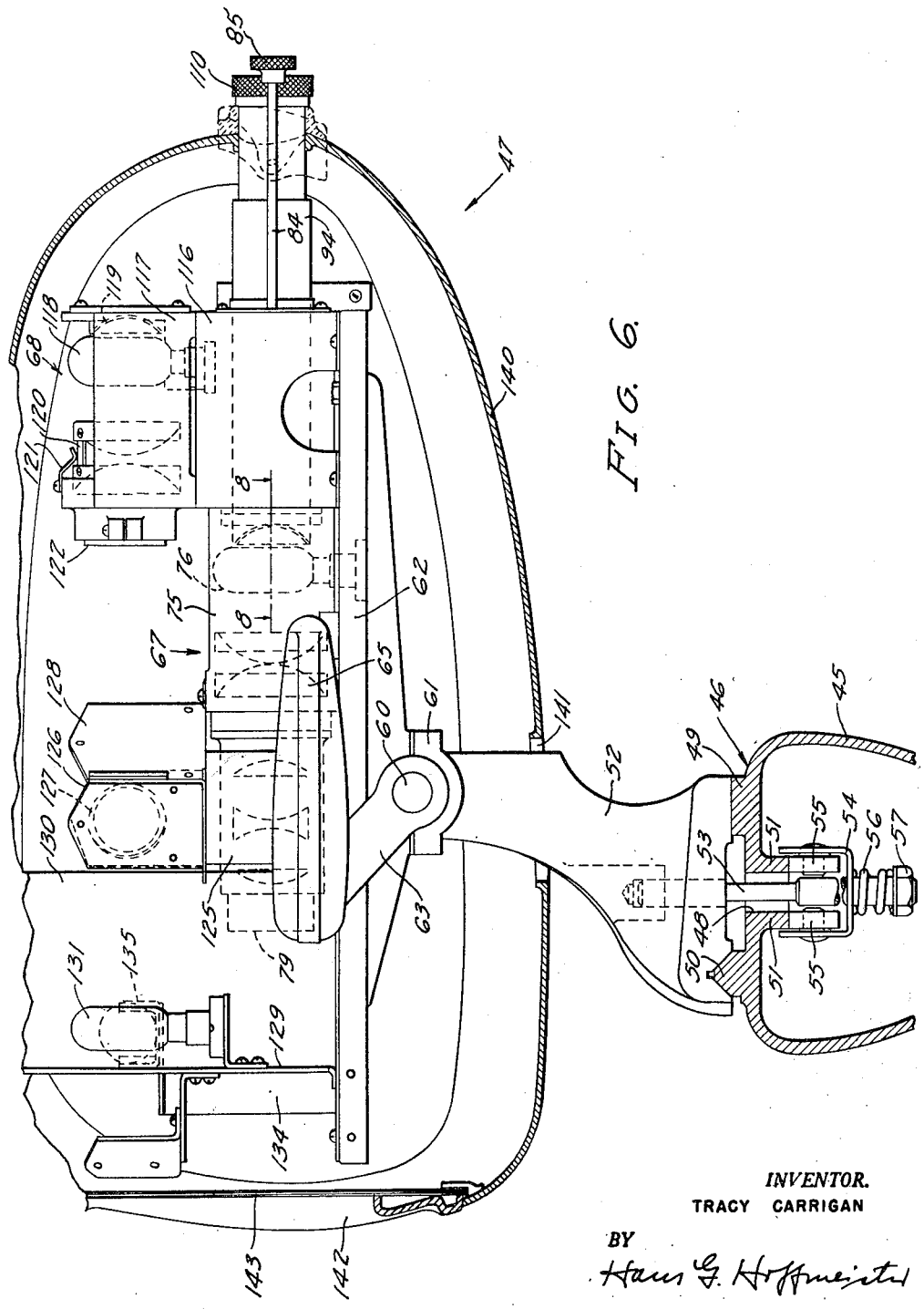
Fig. 6 is a side elevational view of Fig. 5 with the housing in section.

The optical unit 47 includes a pedestal 52 which is formed as shown in Fig. 6 to fit the rails 49 and 50 so that the unit 47 is slidable on these rails. To hold the unit 47 from being accidentally dislodged from snug contact with these rails, the pedestal 52 has a hold-down rod 53 which extends downwardly through the slot 48 and carries a yoke 54 having rollers 55 which are yieldably held upwardly against the rails 51 by a spring 56 coiled about the rod 53 between the yoke 54 and a nut 57 on the lower end of the rod.

Provided on the upper end of the pedestal 52 is a shaft 60 which is gripped by clamps 61 of a unit floor 62, thereby supporting this floor on shaft 60 so that the floor may be adjusted about this shaft if desired. The axis of shaft 60 is parallel with rails 49 and 50. Fixed on one end of the shaft 60 is an arm 63, the upper end of which is provided with a stub-shaft 64, this carrying on its outer end a handle 65 for manipulating the unit 47. The lighting circuit of this unit is controlled through a switch 66 provided on handle 65.

Mounted on the unit floor 62 are two projectors 67 and 68. The projector 67 rests directly on the floor and performs the function of projecting a chart onto a screen 70 which, for convenience, is mounted in a darkened recess 71 provided in a screen cabinet 72 (see Fig. 1).

The projector 67 includes a frame 75 supporting an electric lamp 76, an optical condenser 77, a chart slide box 78, and a projecting lens element 79 which may be of the type known as "Eastman, Model-I-Kodaslide Projector-F3.7-4″ Focus."

Figure 7:
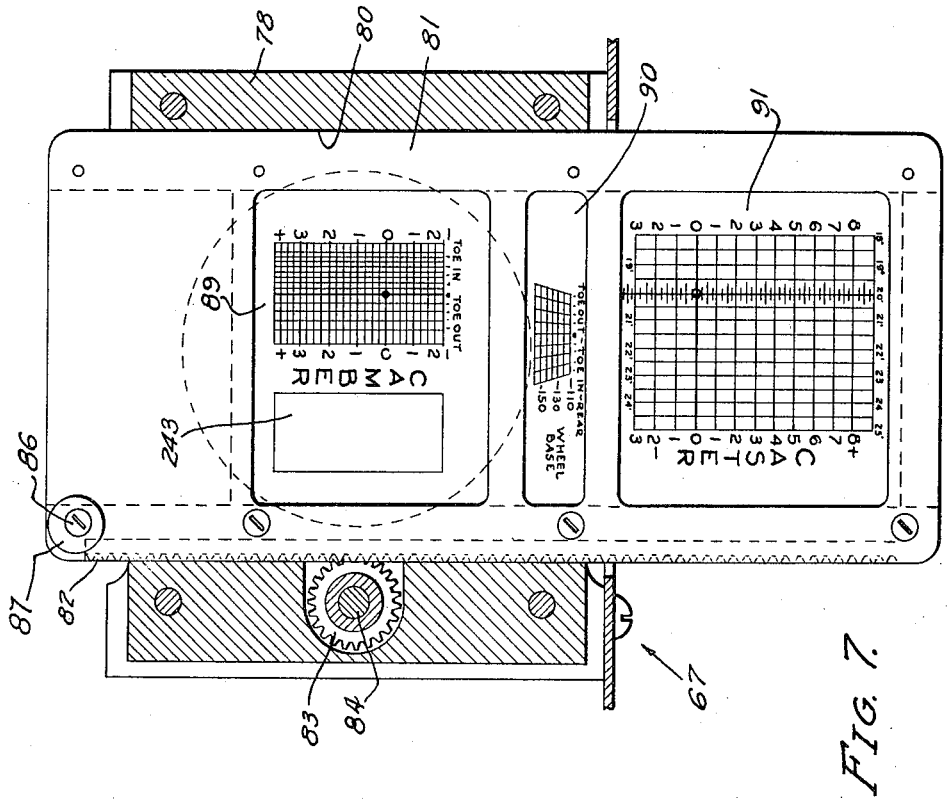
Fig. 7 is an enlarged cross sectional view of the film slide of the chart projector of the invention taken on the line 7—7 of Fig. 5.

As shown in Fig. 7, the slide box 78 provides a vertical slideway 80 in which a film slide 81 having a rack 82 may be slid upwardly or downwardly by engagement of a pinion 83 with this rack. The pinion 83 is fixed on a shaft 84, the latter being mounted in suitable bearings provided on the frame 75 and extending rearwardly to terminate in a knurled head 85. Fixed on the film slide 81 by screw 86 is an eccentric stop 87 which engages the slide box 78 when the slide 81 is in its downwardmost position. By selecting the rotational position in which the stop 87 is snugged against the slide 81, the proper downwardmost position of the latter may be determined within a relatively small margin of adjustment. The slide 81 is provided with a camber chart film 89, a drive wheel chart film 90 and a caster chart film 91. In these films as shown in Fig. 7, the representations of the charts are inverted so that they will appear right side up when projected.

By manipulation of the knurled head 85, the slide 81 may be elevated or depressed in the slideway 80 to selectively project onto the screen 70 a chart image from one of the films 89, 90 or 91 or to adjust the vertical position of one of these charts on said screen.

Figure 8:
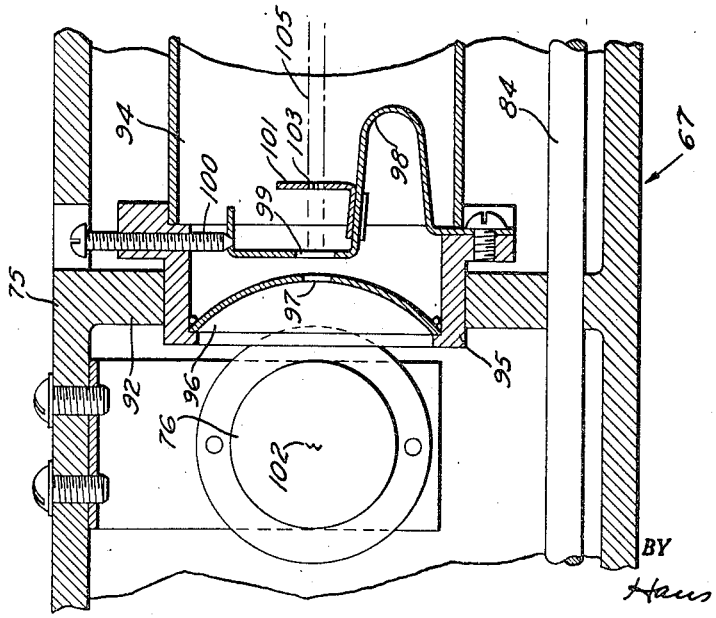
Fig. 8 is an enlarged longitudinal sectional view of the rear beam mask adjuster of the invention and is taken on the line 8—8 of Fig. 6.
Figure 9:
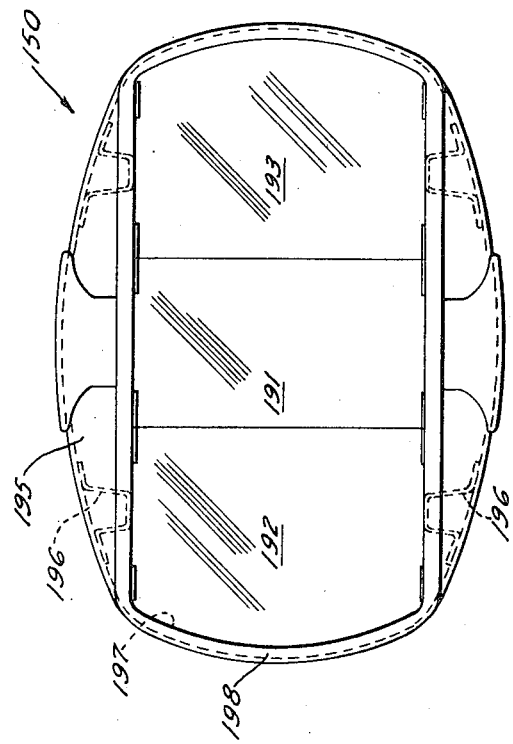
Fig. 9 is a front elevational view of one of the front wheel mirrors of the invention.

The projector frame 75 has transverse walls 92 and 93 which support a telescope 94, the inner end of which has a collar 95 carrying a reflector 96, the latter having a central aperture 97 through which light rays may be emitted rearwardly from the lamp 76 (Fig. 8).

Also provided on the collar 95 is a flat spring 98 bent as shown in Fig. 8 and having a hole 99 disposed opposite the reflector hole 97 and engaged by a screw 100 for adjusting the position of a mask 101 provided on the spring 98 with respect to the filament 102 of the lamp 76. The mask 101 has a cruciform aperture 103 which, by manipulation of the screw 100, is adapted to be disposed coaxially with respect to the telescope 94 so that a beam of light 105 will be projected rearwardly through this aperture along the extended axis of the telescope. Provided on the rear end of the telescope 94 is a collar 110 (Fig. 5) in which is mounted a prism lens 111 which causes the beam 105 to be projected rearwardly as two beams 112 and 113 (Fig. 27).

These beams are disposed in the same vertical plane and may be referred to for purposes of distinguishing them as primary beam 112 and secondary beam 113. The primary beam is preferably projected horizontally and the beam 113 inclined upwardly about 2° from horizontal (Fig. 27).

The projector 68 is mounted on a table 116 (Figs. 5 and 6) provided on floor 62 so as to be located at a higher level than and laterally displaced from the projector 67 (Figs. 5, 6, 17 and 18). The projector 68 includes a frame 117 in which is mounted an electric lamp 118, a reflector 119, a condenser element 120 which is retained in place by a spring 121, and a cross hair beam mask 122. The function of the projector 68 is to project a beam of light through the mask 122 which will ultimately be intercepted by the screen 70 in the form of a cross hair image in a manner and for a purpose which will be made clear hereinafter.

Fixed on the optical unit floor 62 is a table 125 (Figs. 5 and 6) having mounted thereon a mirror 126, a lens 127 and a mirror 128. Also fixed on the floor 62 is a frame 129 carrying a relatively large mirror 130 and also having mounted thereon a locator lamp 131, a locator beam mask 132, and a mirror 133. Fixed on the floor 62 is a bracket 134 carrying a locator beam lens 135. The optical unit 47 is supplied with electricity through suitable conductors (not shown) for energizing the lamps 76, 118, and 131, on a single circuit controlled by the switch 66.

Unit 47 is enclosed by a suitable streamlined housing 140 having a lower aperture 141 for receiving the pedestal 52, a front aperture 142 covered by a window 143, and a side aperture 144.

The apparatus section 31 of the invention also includes a dirigible wheel mirror 150 and a drive wheel mirror 151 which, when performing the method of the invention, are supported on the left dirigible and drive wheels respectively of a vehicle, the alignment characteristics of which are being checked. I prefer to employ for the purpose of so mounting said mirrors a wheel mirror mount 152, the structure of which is fully disclosed in U. S. Patent 2,475,502, granted July 5, 1949 to Herbert G. Holmes.

The mount 152 includes a pair of parallel slide bars 153, adjacent ends of which are fixed in a cross member 154 having rim engaging jaws 155 and 156. Slidable on the opposite ends of the bars 153 is a clutch clamp 157 having a jaw 158. The jaws 155 and 156 and 158 have inner faces which lie in a plane parallel with the plane of the bars 153 and are adapted to be brought to bear against the outer edge of a wheel rim such as the rim 159 in Fig. 3. Each of these jaws has a tooth 160, preferably formed of a hardened screw, which, when the jaws are so positioned, lies outside of the rim 159. The clutch 157 has a clutch mechanism 162 which may be actuated by a handle 163 to grip the bars 153 and, upon further movement of the handle 163, shift the clutch clamp 157 inwardly on these bars.

The mechanism 162 includes a hollow body 164, with which jaw 158 is formed integral. This body has vertically spaced walls 165 and 166 through aligned holes in which the bars 153 slide. Journalled in a hole 167 in wall 166 perpendicular to the plane of the bars 153 is a cam shaft 168 having a notch 169, this shaft carrying the handle 163. Disposed between walls 165 and 166, having holes 170 through which bars 153 normally loosely slide, and yieldably held downwardly by springs 171, is a locking dog 172, the inner end 173 of which turns down and bears against the shaft 168 opposite the notch 169 therein. Normally the dog end 173 rests in notch 169 and bars 153 are free to slide through holes 170. When the shaft 168 is rotated by the handle 163, the dog 172 is first cocked into a gripping relation with bars 153. Further rotation of shaft 168 then shifts the clamp 157 along bars 153, towards the center of the rim 159, thereby embedding the teeth 160 of jaws 155, 156 and 158 in the metal of the rim and securing the mount 152 to said rim.

Slidably mounted on the bars 153 between the member 154 and clutch clamp 157 is a device supporting slide 175 having a socket 176, the bore 177 of which is disposed at right angles to the plane of the slide bars 153. The slide 175 has spring and ball detents 178 (Figs. 11 and 12) which frictionally bear against the slide bars 153 and prevent slide 175 from being accidentally shifted from a position in which it has been placed on said bars.

The dirigible wheel mirror 150 includes a frame 179 having a hub 180, the latter having a bore 181 (Fig. 13). Trapped in the bore 181 by a cap 182 is a double ball bearing 183 into which a shaft 184 extends, the latter being held in said bearing by a plate 185 so that this bearing abuts against a shoulder 186 formed on said shaft. Beyond the shoulder 186 the shaft 184 is of proper diameter to snugly fit the bore 177 of the slide 175 and is held therein as by a set screw 187.

Secured on the frame 179 by clips 190 are a central mirror 191 and wing mirrors 192 and 193, the wing mirrors being inclined backwardly at 20° relative to the central mirror 191. The central mirror 191 is disposed in a plane which is perpendicular to the axis of the shaft 184. Provided on the frame 179 is a counterbalance weight 194 which lowers the center of gravity of the mirror 150 so that this always remains upright in plumb fashion regardless of the rotation of the shaft 184 on which the mirror is mounted. When this shaft is disposed horizontally, the mirror 191 which is perpendicular to the shaft is disposed vertically and the wing mirrors 192 and 193 are so related to the central mirror 191 that they are at this time also disposed vertically.

Enclosing the frame 179 of the mirror 150 is a housing 195 having brackets 196 by which it is secured to the frame. The housing 195 also has a front opening 197 through which the mirrors 191, 192 and 193 are exposed to view, this opening being surrounded and the mirrors framed by a rubber moulding 198 which is mounted on the edge of the housing bordering said opening.

The drive wheel mirror 151 (Figs. 3, 14, 15 and 16) includes a shaft 200 having calibration marks 201 cut therein at regular intervals for a purpose to be made clear hereinafter. This mirror also includes a frame structure 202 which is preferably stamped of light sheet metal and provides spaced holes 203 through which the shaft 200 slidably extends and an apertured, internally-threaded ear 204 which is adapted to receive a thumb screw 205 to permit the latter to be screwed against the shaft 200, thereby locking the mirror 151 in any desired rotated position on this shaft. Mounted on the frame 202 in a plane parallel with the shaft 200 is a mirror 206, this being supported by clamps 207 provided on the frame 202. Enclosing the frame 202 and mirror 206 is a housing 208, the latter having suitable apertures through which the shaft 200 and screw 205 extend. It also has an upper aperture 209 just beneath which a spirit level 210 is mounted on the frame 202. This level is provided with suitable calibrations (see Figs. 14 and 26) for measuring the inclination of the shaft 200 relative to horizontal.

The housing 208 also has a window opening 212 which is framed by a rubber moulding 213 mounted on the housing edge adjacent this opening. Secured to the outer surface of the housing 208 just beneath the window opening 212 is a calibrated screen 214 having vertical calibrations 215 identified by numbers 216 disposed along the upper edge of the screen.

Operation

The apparatus shown in the drawings and described hereinabove is adapted to be employed in the performance of the method of the invention to check the alignment characteristics of the front or dirigible wheels 220 and 220' of an automobile 221 and, in the same operation, check the alignment characteristics of the drive or rear wheels 222 and 222' of said automobile.

Figure 10:
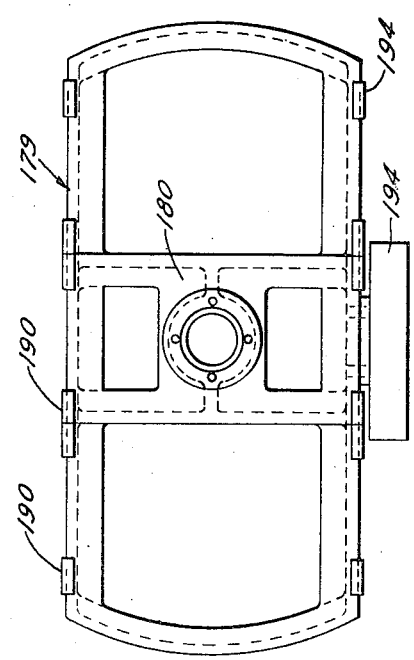
Fig. 10 is a front elevational view of the frame of said front wheel mirror.

In preparation for performing this checking operation the automobile 221 is driven upwardly over the ramps 34 and 34' onto the tracks 33 and 33' until the front or dirigible wheels 220 and 220' rest on the turntables 37 and 37' free from contact with the bumpers 38 and 38'. The front or dirigible wheels 220 and 220' now have wheel mounts 152 and 152' applied thereto with mirrors 150 and 150' carried on said mounts as clearly shown in Figs. 2, 10 and 11.

Rear drive wheels 222 and 222' are also fitted with identical mounts 152 and 152' with the sockets of the latter supporting shafts 200 and 200' and with the mirrors 151 and 151' mounted on said shafts so that the indicia 201 and 201' indicates that these mirrors are equally spaced outwardly from the planes of the outer edges of the rims of the wheels 222 and 222'. By loosening thumb screws 205 and 205', the mirrors 151 and 151' are rotated into substantially vertical positions, the planes of the mirrors 206 and 206' being, of course, perpendicular respectively to the planes of the wheels 222 and 222'.

Figure 22:
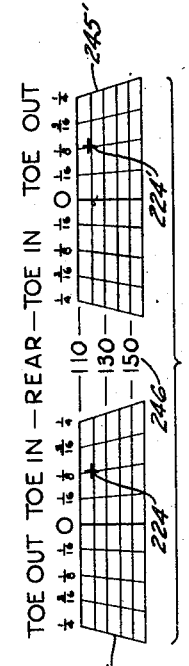
Fig. 22 is a diagram of the left and right drive wheel charts indicating the condition illustrated in Fig. 21.
Figure 24:
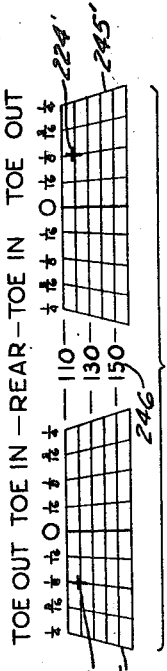
Fig. 24 is a diagram of the left and right drive wheel charts produced by the invention and revealing the condition illustrated in Fig. 23.

The operator now snaps on the switch 66 (Fig. 5), illuminating the lamps in the optical unit 47. This causes the projector 67 to project a chart onto the screen 70 and at the same time project beams 112 and 113 rearwardly. As shown in Figs. 3 and 27, the primary rearward beam 112 impinges on the screen 214 of the drive wheel mirror 151 to form a cruciform beam image 223. The secondary rearward beam 113 is inclined upwardly from the primary beam 112 just enough to impinge upon the mirror 206 so as to be reflected therefrom onto the screen 70 to form a cruciform beam image 224 (Figs. 22 and 24).

As before noted, the two vertical planes, one of which contains left-side rearward light beams 112 and 113 and the other of which contains the corresponding right-side rearward beams 112' and 113', are parallel at all times by virtue of the mounting and adjustment of the optical units 47 and 47'. Correction to maintain this parallelism is accomplished by adjustment of the screws 100 and 100' (see Fig. 8). It should also be noted that beams 112 and 112' are parallel and beams 113 and 113' are parallel.

For the apparatus 30 to perform the method of the invention, it is preferable that each of the optical units 47 and 47' be located a certain predetermined distance laterally from the adjacent dirigible wheel mirror. This correct location of the optical units is accomplished separately and in the same way for each of these units.

In the case of unit 47, the latter is pushed or pulled manually, by grasping the handle 65, to slide the unit on its rails 49 and 50 toward or away from the wheel mirror 150, until the unit is correctly located with respect to said mirror. The operator is able to know that the unit 47 is thus correctly located by observation of the relation between certain images projected by this unit onto the screen 70, as will now be explained.

Figure 5:
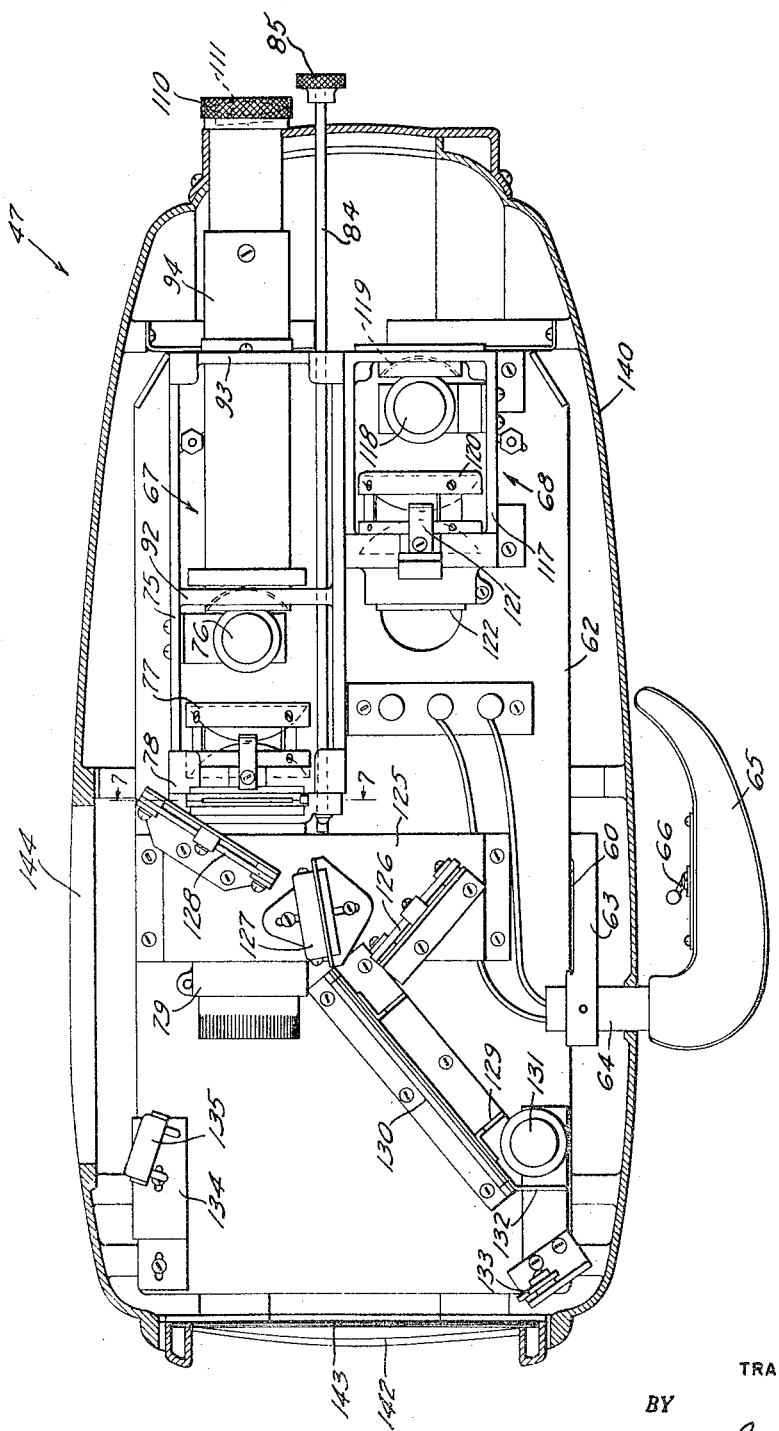
Fig. 5 is a plan view of the left hand optical unit of the apparatus of this invention with the housing in section to show the internal construction.

When the lamps 76, 118 and 131 are energized, the projector 68 projects a beam 225 through the mask 122 which impinges against the mirror 126 (Figs. 5, 17 and 18). From this mirror it is reflected through the lens 127 which suitably refracts the rays of this beam to prevent their unduly spreading, the beam continuing into contact with the center dirigible wheel mirror 191 so that the reflection of this beam from mirror 191 returns outwardly against the mirror 130 from which it is reflected onto the screen 70 to form a cross hair image 226.

The lamp 131 projects a beam of light 227 through a cruciform opening in the mask 132 against the mirror 133 from which this beam is reflected through the lens 135 against the central dirigible wheel mirror 191 from which this beam is reflected onto mirror 128 and thence onto the screen 70 where it forms a cruciform locator image 228. As may be noted from Figs. 6 and 18, the cross hair beam 225 and the locator beam 227, just described, lie in the same horizontal plane as they travel on their way to impingement against the mirror 191. The various elements utilized in projecting these beams are so related that the point in said plane at which said beams meet, lies in the plane of the reflecting surface of the mirror 191 when the optical unit 47 is properly located laterally from the mirror 191 for performing an alignment checking operation.

The mirrors 128 and 130 by which the cross hair beam 225 and locator beam 227 are reflected onto the screen 70 are so angled that when the optical unit 47 is thus properly related to the mirror 191 as shown in full lines in the diagram of Fig. 17, the cross hair image 226 and the cruciform locator beam image 228 are located on the screen 70 in vertical alignment with each other. When the spacing between the optical unit 47 and the mirror 191 is greater or less than the proper distance, these two images are out of vertical alignment. This is indicated in Fig. 17 by the broken line paths of beams 225 and 227 which occur when the spacing between the mirror 191 and the optical unit 47 is greater than the desired distance.

It is thus clear that to properly relate the unit 47 to its dirigible wheel mirror 150, the operator merely shifts it along its slideway 46 until the images 226 and 228 on the screen 70 come into vertical alignment. The proper spacing of the optical unit 47 from the mirror 191 having been thus accomplished, the operator now repeats this procedure on the right hand side of the automobile 221 to correctly locate the optical unit 47' relative to the wheel mirror 191'.

The vertical parallel planes containing the left-side rearward beams 112 and 113 and the right-side rearward beams 112' and 113' are now equidistant laterally from the point 229 (Fig. 19) on the fore and aft axis 230 of the automobile where this axis intersects with the vertical plane passing through the centers of dirigible wheels 220 and 220'. The method of the invention next contemplates a relative rotation about point 229 (Fig. 19) in a horizontal plane between the automobile 221 and the rearward beams 112 and 112' until the fore and aft axis 230 of the automobile and these beams are brought into parallelism.

While the optical units 47 and 47' may be made adjustable to bring about this parallelism, it is preferred to accomplish this by shifting the rear end of the automobile 221 to one side or the other. The amount, if any, which the fore and aft axis of the automobile is out of parallelism with the beams 112 and 112' is determined by observing the location of the cruciform image 223 of beam 112 on the mirror screen 214 and the location of the image 223' of beam 112' on the corresponding screen 214' on the right hand side of the automobile 221. Where these images are not located in exactly the same lateral relation to the indicia of these two screens, the rear end of the automobile is shifted laterally until they are.

To prevent any error being introduced into the readings for the alignment characteristics of the front wheels 220 and 220' by the rim of one of these being bent out of perpendicularity with its axis of rotation, the front end of automobile 221 is now lifted by the jacks 40 and 40'. The wheels 220 and 220' are then rotated and any wobble indicated by a circular movement of cross hair images 226 and 226' on the screens 70 and 70' is noted.

These wheels are now halted with the images 226 and 226' at points disposed half way between upper and lower extremes of their circular paths and lowered onto turntables 37 and 37'. These circular paths will hereafter be referred to as "wobble circles." While not necessary to secure accurate results the front wheels 220 and 220' are, for the sake of uniformity, preferably always halted with the images 226 and 226' in the same direction from the centers of said wobble circles.

The apparatus 30 has now been completely adjusted and the automobile 221 and the apparatus brought into a proper relationship for commencing to check the alignment characteristics of the front or dirigible wheels 220 and 220' and also those of the rear or drive wheels 222 and 222'. The checking of these two pairs of wheels may be done in any order desired, that is, the front wheels may be checked first and then the rear wheels, or the rear wheels may be checked first and after that the front wheels.

The steps involved in the checking of the alignment characteristics of the front wheels from this point on are identical with the corresponding steps employed for checking the alignment characteristics of dirigible vehicle wheels disclosed in the aforesaid U. S. Patent 2,470,090. A brief description of this follows:

Checking dirigible wheels

With the apparatus set as above described, the alignment characteristics of the dirigible wheels are preferably checked in the following order: camber, toe-in or toe-out, steering geometry and caster. The first three of these characteristics are checked by camber charts 240 and 240' projected on the screens 70 and 70', the chart 240 being illustrated in Fig. 28. The projection of the chart 240 on the screen 70 by the optical unit 47 is accomplished by rotating the knurled head 85 (see Figs. 5 and 6) so as to lower the slide 81 to its lowermost position in the slideway 80 until this will bring the camber chart film 89 into the projection path of the projector 67 and cause chart 240 to be projected in its proper position on the screen 70. This position is such that where there is a zero amount of camber in the dirigible wheel 220, and with the latter turned straight ahead, the cross hair image 226 will fall on the horizontal zero line of chart 240. Any positive or negative camber in the wheel 220 however will be correctly indicated in degrees by the appearance of the cross hair image 226 below or above the zero line of the chart 240. The position of the cross hair image 226 on the chart 240 in Fig. 28 indicates that the wheel 220 has a positive camber of 1°.

In a similar manner, the actual camber of dirigible wheel 220' is indicated by the position of the cross hair image 226' on the camber chart 240' which is projected on the screen 70'.

Before checking toe-in or toe-out of the wheels 220 and 220' these are again raised by jacks 40 and 40' and rotated. These wheels are then lowered with the cross hair beam images 226 and 226' at points half way between the horizontal extremes of their respective wobble circles.

To check toe-in or toe-out of the wheels 220 and 220', these are now turned by the steering mechanism of the automobile 221 so that the cross hair image 226' falls on the vertical zero line in the toe-in section of the camber chart 240'. By reference now to the camber chart 240 as shown in Fig. 28, the toe-in or toe-out characteristic of the wheels 220 and 220' may be read by the location of the cross air image 226 on the chart 240. In this view, an actual toe-in of one quarter of an inch is correctly indicated. To check the steering geometry of the wheels 220 and 220', the operator merely rotates the steering wheel to turn the wheels 220 and 220' about their king pins so that the cross hair image of the wheel on the outside of the turn rests on the vertical 20° line of the caster chart of that wheel. The operator is then able to read the actual angle at which the wheel on the inside of the turn is turned about its king pin, by the position of the cross hair image on the caster chart of said inside wheel.

By virtue of the small size of the camber chart 240, it is not necessary to occupy the entire area of the screen 70 by this chart, and the film 89 thus provides an area 243 on which advertising material or instructions may be placed and which will be projected on the screen 70 alongside of the chart 240.

The apparatus 30 and automobile 221 are at this time also properly arranged for checking the caster of front wheels 220 and 220'. The caster of the wheel 220 is checked entirely independently from the caster of the wheel 220'. As these two operations are identical, a description of one will suffice for both. To check caster on the wheel 220, the knurled head 85 is rotated to elevate the slide 81 to bring the caster chart film 91 into the projection path of the projector 67. This will cause the projector 67 to project onto the screen 70 a caster chart 241 as shown in Fig. 29. The wheel 220 is now angled to turn this to the left until the cross hair image 226 is located on the vertical 20° line of this chart. This indicates that the plane of the wheel 220 is turned outward exactly 20° from straight ahead and the mirror 192 is now automatically substituted in place of the mirror 191 of the wheel mirror 150 for intercepting and reflecting the beams 225 and 227 which form the cross hair image 226 and locator image 228. With the cross hair image 226 thus located with reference to the caster chart 241, the knurled head 85 is rotated to adjust the caster chart film 91 vertically to cause the cross hair image 226 to fall on the horizontal zero line of this chart as shown in Fig. 29.

The wheel 220 is now angled inwardly until the cross hair image 226 leaves the field of the chart 241, reappears to cross this chart again and disappear, and then again reappears on the chart and comes into alignment with the 20° vertical reference line of chart 241 as shown in Fig. 30. The position of the cross hair image 226 on this line will now indicate the caster of the wheel 220 in positive or negative degrees. The caster as indicated in Fig. 30 is positive 4° and 30'.

The caster of the wheel 220' is now checked in the same manner by the right hand apparatus section 31'.

*Checking drive wheels*

With the automobile 221 positioned on the apparatus 30 as shown in Fig. 2 and with the wheel mirrors applied and the optical units 47 and 47' properly located relative to the front wheel mirrors 150 and 150', the method of this invention is adapted to be employed as follows in checking the alignment characteristics of the rear drive wheels 222 and 222'.

The first steps in checking the alignment of the rear wheels are of course the projecting of the beams 112 and 113 in parallel relation with the beams 112' and 113' respectively (and extending alongside the automobile 221) and locating the light units 47 and 47' so that these are equidistant laterally from point 229 in the fore and aft axis 230 of automobile 221 (Fig. 19) where this axis intersects a vertical plane passing through the centers of the wheels 220 and 220', and then causing a relative rotative movement between the beams and the automobile in a horizontal plane about said point 229 (Fig. 19) to bring the vertical plane of the beams 112 and 113 and the vertical plane of the beams 112' and 113' into parallelism with said automobile axis and equidistant laterally therefrom. The manner of accomplishing these steps has already been described.

It is necessary now to shift the chart film slides 81 and 81' (Fig. 7) of the projectors 47 and 47' to bring the wheel base drive wheel chart films 90 and 90' into the projection paths of said projectors 47, 47' so as to project drive wheel checking charts 245 and 245' (Fig. 24) respectively onto the screens 70 and 70'. As already noted, the light beams 113 and 113' impinge upon the mirror elements 206 and 206' (Fig. 3) of the drive wheel mirrors 151 and 151' and are reflected therefrom onto the screens 70 and 70' (Fig. 27) so as to project cruciform beam images 224 and 224' (Fig. 24). By rotational adjustment of the mirrors 151 and 151' on their respective shafts 200 and 200', the beam images 224 and 224' are now brought onto the charts 245 and 245' in selected vertical positions thereon, which, according to the indicia 246 appearing alongside each of these charts, correspond with the wheel base of the automobile 221. As noted in Figs. 20, 22 and 24, the divisions representing a given amount of toe-out or toe-in on the horizontal lines on charts 245 and 245' progressively increase from the upper to the lower limits of these charts. The divisions on each of these horizontal lines are suitable for measurement of the amounts of toe-out or toe-in numerically indicated at the upper edge of these charts for a wheel base of a given length. As the wheel base increases in length, it requires a larger horizontal distance on the chart to indicate a given amount of toe-out or toe-in in a rear wheel of the automobile being tested. Each of the indicia 246 indicates a wheel base of a certain length and is disposed opposite the horizontal lines of the charts 245—245' upon which the images 224—224' should be projected in order to give a correct reading of toe-out or toe-in for a car having that wheel base.

For instance, as the wheel base of the automobile 221 is approximately 118 inches, the operator projects the images 224 and 224' onto the charts 245 and 245' just above the horizontal lines on these charts which, according to the indicia 246, correspond to a wheel base of 120 inches. This is necessary for the readings on the charts 245 and 245' to be correct because the longer the wheel base of the automobile being tested, the greater distance the mirrors 151 and 151' are located rearwardly from the screens 70 and 70' and from the optical units 47 and 47' and thus the greater the distance which the beam images 224 and 224' will fall to one side or the other of the vertical zero lines of these charts for a given degree of deflection from true alignment of the drive wheels 222 and 222'.

The next step in checking the alignment of the drive wheels is to successively jack up the rear corners of the automobile 221 and make correction of the positions of the beam images 224 and 224' which are necessary to eliminate lateral deflections due to one or both of the drive wheel rims being bent so that the plane of the wheel rim is out of perpendicularity to the axis of the wheel's rotation. For the wheel 222, this is done by jacking up the left rear corner of the automobile 221, loosening the screw 205 (Figs. 14, 15 and 16) of the mirror 151 and while holding this mirror so as to keep the beam image 224 on the chart 245, rotating the wheel 222 a full revolution and noting the extremes of movement of the image 224 on the chart 245 (Figs. 20, 22 and 24) to the left and to the right. The wheel 222 is then stopped at a position in which the image 224 is at the midpoint between said extremes. The left rear corner of the automobile 221 is now lowered so that the wheel 222 will again rest on the wheel track 33. The position of the beam image 224 on the chart 245 will now correspond to what it would be if the wheel 222 were not bent but, instead, were perpendicular to its axis of rotation.

The same thing as just described is now done with the right drive wheel 222' while the right rear corner of the automobile 221 is temporarily elevated.

When the foregoing steps have been completed, it is possible to determine alignment characteristics of the axis of rotation of the rear drive wheels 222 and 222' by reading the positions of the beam images 224 and 224' on the charts 245 and 245' and by reading the spirit levels 210 and 210' (Figs. 15, 16 and 17).

Figure 20:
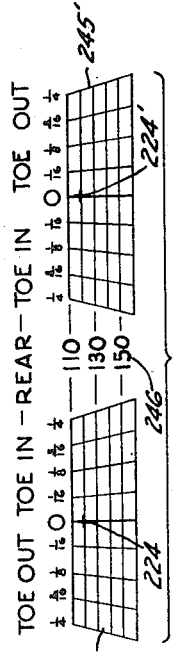
Fig. 20 is a diagram of the left and right drive wheel charts produced by said apparatus in the check illustrated in Fig. 19 and indicating perfect rear wheel alignment.
Figure 19:
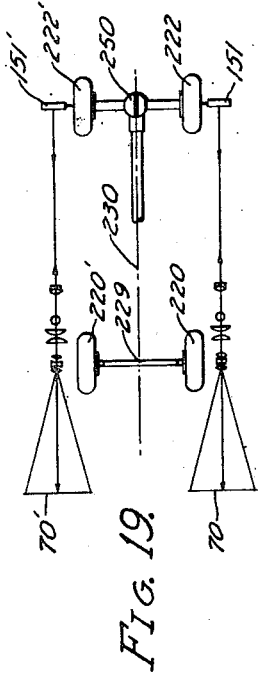
Fig. 19 is a plan diagram of the invention being used to check the alignment of the rear wheels of an automobile in which said alignment is found to be perfect.

Figs. 19 and 20 diagrammatically illustrate positions of the beam images 224 and 224' on the charts 245 and 245' which show the axes of rotation of the drive wheels 222 and 222' to lie in a vertical plane which is perpendicular to the fore and aft axis 230 of the automobile 221. Assuming that there is no vertical or horizontal distortion of the rear axle housing 250, and that the wheels 222 and 222' thus rotate coaxially, the check illustrated in Figs. 19 and 20 indicates perfect alignment of the wheels 222 and 222'.

The checking of these wheels to see whether these are bent out of perpendicularity with their respective axis of rotation may have indicated one or both wheels so affected. Nevertheless, in the absence of a rear axle housing defect, the appearance of the images 224 and 224' on the central vertical zero lines of the charts 245 and 245' indicates that when any bent condition is eliminated from the wheels 222 and 222', these will have true coaxial rotation in parallel planes about an axis which is at right angles to the fore and aft axis 230 of the automobile 221.

Figure 21:
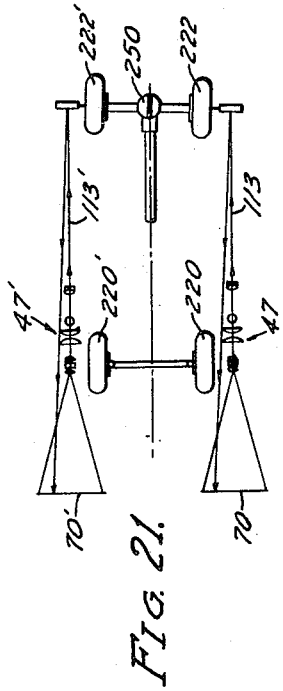
Fig. 21 is a plan diagram of of the invention being employed to check the alignment of the drive wheels in which the differential housing is found to be cocked.
Figure 23:
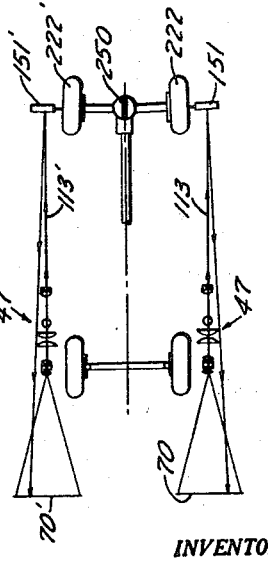
Fig. 23 is a plan diagram of the invention being employed to check the alignment of the drive wheels of an automobile in which the differential housing is sprung so that the axes of rotation of the wheels on each end of this are out of alignment with each other in a horizontal plane.

Figs. 21 and 22 illustrate a check on the drive wheels 222 and 222' in which the beam images 224 and 224' both fall to one side of the central vertical zero lines of the charts 245 and 245'. This discloses that the entire rear axle unit embracing the housing 250 and the drive wheels mounted thereon has rotated about a vertical axis so that the wheel 222 is shifted forwardly relative to the frame of the automobile, and the wheel 222' has shifted rearwardly relative to said frame. Thus while the wheels 222 and 222' may still rotate coaxially on the housing 250, the axis of their rotation is not perpendicular to the fore and aft axis 230 of the automobile 221, but as shown in Fig. 21 and indicated on the charts in Fig. 22, is turned toward the right. That is, the left drive wheel 222 toes in and the right drive wheel 222' toes out a corresponding amount. The actual distance of deflection of these wheels relative to the frame of the automobile is measured on the charts 245 and 245' by the indicia appearing along the upper edges of these charts. Thus in Fig. 22, the wheel 222 is shown as being shifted one-eighth of an inch forwardly from its true position on the frame of the automobile and the wheel 222' is shown as being shifted one-eighth of an inch rearwardly from its true position on the frame. Figs. 23 and 24 illustrate a check of the drive wheels 222 and 222' in which a distorted housing 250 is indicated, the distortion in a horizontal plane so that both of these wheels toe out.

Figs. 25 and 26 illustrate the manner in which a distortion of the housing 250 in a vertical plane may be detected by readings of the spirit levels 210 and 210' after the apparatus 30 has been set up in proper relation to the automobile 221 and correction made for either of the wheels 222 and 222' being bent as aforesaid. The levels 210 and 210' have suitable calibrations by which the deflection in a vertical plane of the axes of rotation of the drive wheels from true coaxial alignment may be read.

An outstanding advantage of the present invention is that the relationship of the cross hair image and the locator beam image, which indicates the correct spacing between the optical unit producing these images and the adjacent dirigible wheel mirror, is not distorted by excessive camber in the dirigible wheel on which said mirror is mounted as happens in certain previous optical wheel aligners, such as that disclosed in the aforesaid U. S. Patent 2,470,090, when said dirigible wheel is being tested for caster. This freedom is brought about by projecting the cross hair beam and locator beam in the same plane as they approach the wheel mirror so that they strike this mirror on the same horizontal level. Excessive camber, therefore, as in the dirigible wheel 220 for instance, does not introduce any substantial change in the respective lengths of the paths traveled by the beams 225 and 227, on their way to the screen 70, when the wheel 220 is being checked for caster.

Projecting beams 225 and 227 in the same horizontal plane, so that these beams meet at a point located in the plane of the mirror 191 when the unit 47 has been moved into the proper spaced relation with the mirror, has the effect of reducing distortion, simplifies the construction and operation of the apparatus 30, and permits dirigible wheels of a large variety of diameters to be checked with a wheel mirror, such as the wheel mirror 150, in which the reflecting mirrors are relatively small in area.

Whereas no scales have been shown for use in making an exact reading of the angle which the plane of a bent wheel has with respect to its axis, either in the dirigible wheels or in the drive wheels of an automobile, these angles are readily determinable from the diameter of a wobble circle produced by a dirigible wheel, and by the distance between opposite extremes of movement of a rearward beam image, such as the image 224, when the drive wheel producing this image is rotated.

A reading of said angle in a drive wheel may also be made by observing the extremes of movement of the bubble in a spirit level (such as the level 210) of the drive wheel mirror mounted on this wheel, while the latter is being rotated to see whether or not it is bent.

From the disclosure embracing the accompanying drawings and the above description, it is believed clear that the present invention provides a novel and extremely efficient method and apparatus by which the alignment characteristics of all four wheels of an automotive vehicle may be readily checked and that this may be accomplished in a relatively short time. It is also believed evident that the significance of the test will be manifest to an unskilled observer so that the average car owner will be assured of the correctness of the diagnosis of the alignment characteristics of his automobile before work is started on it and be likewise assured by a recheck after the work is completed that the errors in alignment discovered by the first check have been corrected.

Whereas the invention as disclosed herein is especially adapted for checking the alignment characteristics of two front dirigible wheels of a vehicle and two, rear, non-dirigible, drive wheels of said vehicle it is to be understood that in its broader applications, the invention is by no means restricted to use in these specific operations.

It is to be further understood that while the front wheels of an automotive vehicle are ordinarily dirigible and the rear wheels non-dirigible and employed to drive the vehicle, the rear wheels might be made dirigible and the front wheels employed to drive the vehicle and even be made non-dirigible, but the invention is readily adaptable to checking the alignment characteristics of such wheels by application of the principles disclosed herein.

It is therefore to be understood, where reference is made in the claims to checking operations performed on rear wheels or drive wheels, these terms are to be broadly construed as covering any non-dirigible supporting wheels of the vehicle whether idle or driven and no matter where these may be placed along the sides of the vehicle.

Whereas the most sensitive action in the opposite horizontal shifting of images 226 and 228 is secured by beams 225 and 227 being projected forwardly and inwardly, and rearwardly and inwardly, respectively against mirror 191, it is to be understood that a less sensitive and therefore less desirable action may be produced by directing both of said beams forwardly and inwardly or rearwardly and inwardly against said mirror along converging paths and in the same plane.

It also should be pointed out that while it is preferable to bring the light beams 112 and 112' into parallelism with each other and with the vehicle axis 230 and equidistant from the latter, many benefits of the invention may be realized without conforming to all these conditions.

For instance, it is important that beams 112 and 112' be substantially parallel with each other, that they do not diverge too much from parallelism with the horizontal plane of the axis 230, and that these beams travel in parallel vertical planes. Various lateral measurements of value may be made by the use of said beams under these conditions even though the vertical planes aforesaid are not spaced equidistant laterally from vehicle axis 230, so long as allowance be made for the different lateral spacing of said planes.

It is likewise important that the light beams 113 and 113' be substantially parallel and lie in the same parallel vertical planes in which beams 112 and 112' travel. They preferably come from the same respective sources and thus diverge upwardly at slight angles from beams 112 and 112'. Nevertheless beams 113 and 113' could accurately perform their functions of indicating the toe-in and toe-out of the rear vehicle wheels 222 and 222' even though the parallel vertical planes containing said beams are not equally spaced laterally from vehicle axis 230.

In the preferred embodiment of the invention above described, the projection base is mounted for rectilinear movement towards or away from the wheel mirror along a path which is parallel with a line passing through the centers of the dirigible wheels when the latter are turned straight ahead. To simplify the definition of this line in the claims, it will be assumed without mention being made thereof, that the wheels are turned straight ahead when their centers determine this line. It should also be noted that while the direction of movement of the projection base is preferably parallel with said line, deviation from parallelism is possible so long as said direction has a fixed orientation relative to said line.

The present application is a division of my copending application Serial No. 659,317 filed April 3, 1946, for Method of and Apparatus for Measuring Alignment Characteristics of Front and Rear Wheels, now Patent 2,601,262, granted June 24, 1952.

Having thus described my invention when I claim as new and desire to protect by Letters Patent is:

1. A method of determining a deviation from perpendicularity of the plane of the rim of a vehicle wheel with its axis of rotation which comprises: pivotally mounting a plane mirror on the rim of said wheel on an axis perpendicular to the plane of said rim, rotating said wheel about the axis on which it is mounted on said vehicle, said wheel at the same time rotating at the same rate with respect to said mirror about the axis on which the latter is mounted on said rim; projecting a light beam, with a fixed orientation, against said mirror during the rotation of said wheel; and disposing a calibrated screen to intercept said light beam after it has been reflected from said mirror to measure the deviation of the plane of said wheel rim from perpendicularity with the axis of rotation of said wheel.

2. A method of determining a deviation from perpendicularity of the plane of the rim of a vehicle wheel with its axis of rotation which comprises: mounting a plane mirror on the rim of said wheel with the face of said mirror parallel with the plane of the rim of said wheel, rotating said wheel, projecting a light beam with a fixed orientation against said mirror during the rotation of said wheel, and disposing a calibrated screen to intercept said light beam after it has been reflected from said mirror to measure the deviation of the plane of said wheel rim from perpendicularity with its axis of rotation.

3. A method of determining an alignment characteristic of the rim of a vehicle wheel which comprises: mounting a plane mirror on the rim of said wheel with the face of said mirror parallel with the plane of the rim of said wheel; rotating said wheel; projecting a beam of light with a fixed orientation against said mirror; disposing a calibrated screen to intercept said beam after it is reflected from said mirror, the rotation of said wheel causing the beam image on said screen to move in a wobble circle indicating the precise amount and the aspect of any non-perpendicularity of the plane of said wheel rim with reference to its axis of rotation; halting said wheel with the image on said screen disposed halfway between extreme locations of said image on a given diameter of said circle whereby the amount of said alignment characteristic of said wheel will be indicated on said screen by the relationship between the calibrations on said screen and said beam image in its adjusted position.

4. A method of determining a deviation of the plane of the rim of a vehicle wheel from perpendicularity with its axis of rotation which comprises mounting a plane mirror on the rim of said wheel with the face of said mirror having a known orientation with the plane of the rim of said wheel, projecting a light beam with a fixed orientation relative to the axis of rotation of said wheel against said mirror, disposing a screen to intercept the light beam reflected from said mirror, rotating said wheel whereby when the plane of the wheel rim is inclined relative to its axis of rotation the reflected image of the beam on the screen will be displaced over a range proportional to the amount of such inclination, and measuring the range of displacement of said image.

5. A method of determining the amount the rim of a wheel is inclined relative to a plane normal to the axis of rotation of the wheel comprising the steps of mounting a mirror on said wheel to extend laterally in a plane substantially perpendicular to the inclined plane of the rim and for rotation about an axis perpendicular to the plane of the rim, projecting a light beam in a fixed direction against said mirror, disposing a screen to intercept said light beam reflected from said mirror, rotating said wheel, holding said mirror against rotation while the planar position of said mirror is shifted relative to the fixed light beam due to the inclination of the plane of the rim and the rotation of the wheel, and measuring the displacement of the image of the beam on said screen resulting from the shifting of the planar position of the mirror.

6. A method of determining the inclination of the rim of a wheel relative to a plane normal to the axis of rotation of the wheel comprising the steps of mounting a plane mirror on said wheel for rotation therewith with the reflecting surface of the mirror parallel to the inclined plane of the rim, projecting a light beam in a fixed direction against said reflecting surface, disposing a screen in position to intercept the light beam reflected from said reflecting surface, rotating said wheel to continuously change the planar position of said inclined reflecting surface relative to said fixed beam thereby causing the image of said beam on said screen to move in a circular path the diameter of which is proportional to the amount of inclination of the reflecting surface, and measuring the diameter of said circular image.

7. A method of determining the amount the rim of a wheel is inclined relative to a plane normal to the axis of rotation of the wheel comprising the steps of mounting a plane mirror on said wheel for rotation therewith with the reflecting surface of the mirror parallel to the inclined plane of the rim, projecting a light beam against said reflecting surface in a plane parallel to the axis of rotation of the wheel, disposing a screen in position to intercept the light beam reflected from said inclined reflecting surface, rotating said wheel whereby the image of said beam on the screen will move in a circular path, and measuring the diameter of said circle.

8. Apparatus for determining the inclination of the plane of the rim of a rotatable wheel relative to a plane normal to the wheel axis, comprising a member extending transversely across the wheel for clamping engagement at its opposite ends with diametrically opposed portions of said rim, a plane mirror rotatably mounted substantially centrally of said clamping member for rotation on an axis perpendicular to the plane of said rim, means for projecting a light beam in a fixed direction against said mirror, and a calibrated screen disposed to intercept the beam image reflected from said mirror, whereby rotation of said mirror relative to said rim serves to position the mirror in a substantially vertical plane for the reception of said projected light beam, and thereafter to vary the vertical position of the reflected beam image on said calibrated screen, and rotation of said wheel relative to the mirror thus adjusted causes said beam image to traverse horizontally a fixed range on said calibrated screen to determine the inclination of the wheel rim relative to a plane normal to the wheel axis.

9. Apparatus for determining the alignment characteristics of an automobile wheel rim relative to a plane normal to the wheel axis, comprising a member extending transversely across the wheel for clamping engagement at its opposite ends with diametrically opposed portions of the wheel rim, a plane mirror mounted substantially centrally of said clamping member for rotation on an axis perpendicular to the plane of said rim, a light source positioned adjacent the forward portion of the automobile for projecting a beam of light rearwardly of said automobile against said mirror, and a projected calibrated screen chart disposed forwardly of said automobile to intercept the beam image reflected from said mirror, said projected and reflected light beams being disposed in a vertical plane parallel to a vertical plane coincident with the central longitudinal axis of the automobile, whereby rotation of said mirror relative to the stationary rim serves to orient the mirror into a substantially vertical plane for the reception and reflection of said projected light beam and thereafter to vary the vertical position of the reflected beam image on said calibrated screen chart in accordance with the known wheel base of the automobile, and subsequent rotation of said wheel relative to the non-rotating mirror thus adjusted causes said beam image to traverse horizontally said calibrated screen chart to determine the misalignment of the automobile wheel rim relative to said plane normal to the wheel axis.

References Cited in the file of this patent

UNITED STATES PATENTS

| | | |
|---|---|---|
| 2,038,914 | Templeton | Apr. 28, 1936 |
| 2,086,391 | Poole | July 6, 1937 |
| 2,393,631 | Harrison et al. | Jan. 29, 1946 |
| 2,402,856 | Turrettini | June 25, 1946 |
| 2,410,339 | Creagmile | Oct. 29, 1946 |
| 2,436,892 | Hunter | Mar. 2, 1948 |